(12) United States Patent
Wang (10) Patent No.: US 11,008,761 B2
(45) Date of Patent: May 18, 2021

(54) METHOD AND APPARATUS FOR WALL PLANKS

(71) Applicant: Lee Wang, Newport Coast, CA (US)

(72) Inventor: Lee Wang, Newport Coast, CA (US)

( * ) Notice: Subject to any disclaimer, the term of this patent is extended or adjusted under 35 U.S.C. 154(b) by 0 days.

(21) Appl. No.: 16/848,791

(22) Filed: Apr. 14, 2020

(65) Prior Publication Data

US 2020/0240150 A1 Jul. 30, 2020

Related U.S. Application Data

(63) Continuation of application No. 16/593,213, filed on Oct. 4, 2019, now Pat. No. 10,662,655, which is a continuation of application No. 16/292,291, filed on Mar. 4, 2019, now Pat. No. 10,480,198.

(60) Provisional application No. 62/637,585, filed on Mar. 2, 2018.

(51) Int. Cl.
| | |
|---|---|
| *E04F 13/16* | (2006.01) |
| *E04F 13/08* | (2006.01) |
| *B32B 27/30* | (2006.01) |
| *B32B 27/08* | (2006.01) |
| *B33Y 80/00* | (2015.01) |

(52) U.S. Cl.
CPC .......... *E04F 13/165* (2013.01); *B32B 27/08* (2013.01); *B32B 27/304* (2013.01); *E04F 13/0866* (2013.01); *E04F 13/0873* (2013.01); *E04F 13/0885* (2013.01); *B32B 2262/101* (2013.01); *B32B 2307/208* (2013.01); *B32B 2419/04* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 2006/0165979 A1* | 7/2006 | Kinsey ..................... | C09J 7/38 |
| | | | 428/343 |
| 2016/0237696 A1* | 8/2016 | Frommherz ............ | E04F 13/16 |
| 2017/0217133 A1* | 8/2017 | Jordan .................... | B32B 21/14 |
| 2018/0163413 A1* | 6/2018 | Odum ..................... | B32B 27/34 |
| 2018/0186132 A1* | 7/2018 | Ikeda ................... | E04F 13/0866 |
| 2018/0244877 A1* | 8/2018 | Miyamoto ............. | B32B 27/26 |
| 2018/0251986 A1* | 9/2018 | Taylor, Jr. ................ | B32B 7/08 |
| 2018/0283014 A1* | 10/2018 | Hodgkins ............. | B32B 21/047 |
| 2018/0320388 A1* | 11/2018 | Lombaert ................ | B32B 5/18 |
| 2018/0363304 A1* | 12/2018 | Hannig .................... | B32B 3/30 |
| 2019/0061416 A1* | 2/2019 | Knevels .................. | C03C 17/02 |
| 2019/0063075 A1* | 2/2019 | Lautzenhiser ...... | E04F 13/0883 |

\* cited by examiner

*Primary Examiner* — Brian E Glessner
*Assistant Examiner* — Adam G Barlow
(74) *Attorney, Agent, or Firm* — Alexander Chen, Esq.

(57) ABSTRACT

A wall tile adapted to be molded from materials, including PVC composition material, and comprising: a planar top panel, which comprises an urethane stain shield, a second planar panel which comprises a first Polyvinyl chloride composition, a third planar panel which comprises a composite material having 3D printing on it, a Fourth planar panel which comprises a webbed fiberglass composition, a fifth planar panel which comprises a magnetic substrate, a sixth planar panel which comprises a second Polyvinyl chloride composition, and a seventh panel which comprises a self-adhesive composition.

1 Claim, 7 Drawing Sheets

Prior Arts

METHOD AND APPARATUS FOR WALL PLANKS

REFERENCE

This a continuation in part application which claims the benefits of the U.S. Non-Provisional application Ser. No. 16/593,213 entitled Method and. Apparatus for Wall Plank which claims the benefit of U.S. Non-Provisional application Ser. No. 16/292,291 entitled Method and Apparatus for Wall Plank which claims the benefit of the U.S. Provisional Application for Pat. No. 62/637,585, entitled "Method and Apparatus for Vinyl Wall Planks Applications", filed on Mar. 2, 2018, which is incorporated herein in its entirely.

FIELD OF INVENTION

The current invention generally relates to wall laminates and methods of creating a wall of laminates. Specifically, the present invention relates to vinyl wall planks that are used for wall decor, and having natural patterns printed on its surfaces like wood, or other designed surface covering systems.

BACKGROUND OF THE INVENTION

Wall covers, such as wallpapers, have been limited by the tradeoff between preferred materials, including their aesthetic, and ease of installation. Wallpapers usually consist of a backing, ground coat, applied ink, and sometimes paste on the backing used to adhere the papers to the wall. Non-woven backings can be of ground wood, wood pulp, or wood pulp with synthetic material. Woven backings are those made of sturdy woven textiles such as drill. The woven backing is then coated and printed. The ground coat is the background color laid on the surface, which receives the printed pattern. Coatings or laminates are made of latex or vinyl (polyvinyl chloride) and render the paper durable and strippable. Ground coats also include additives that enhance the ease of handling, opacity, and drapability of the paper. Wallpapers are used in interior decoration to decorate the interior walls of domestic and public buildings. They are usually sold in rolls and are applied onto a wall using wallpaper paste, or other adhesive. Wallpapers can come plain as "lining paper" so that it can be painted over, or textured with a regular repeating pattern design, or with a single non-repeating large design carried over a set of sheets.

Wall tiles are usually made of clay, but other materials, like wood, natural stones or glass have been used. A tile is a thin object usually square or rectangular in shape. Modern materials have been used to make tiles. The most widely used due to its durability and waterproofness are modern vinyl tiles. These tiles are composed of colored polyvinyl chloride (PVC) chips formed into solid sheets of varying thicknesses (⅛" is most common) by heat and pressure. These tiles are stuck to a wall by a thin layer of adhesive.

At one end of the spectrum, there are wall papers which can be printed with much elaborated patterns and arts and fairly easily installed, but cannot easily taken off, and the patterns and arts are 2-D flat. At the other end of the spectrum, there are marble tiled walls that cannot have elaborated patterns or arts, but they have the natural look and feel of a natural stone. Since marble is a natural stone, a wall of marble is every expensive, heavy, and requires construction skills, time, and good adhesive to build a marble wall. Since it is expensive, and labor intensive, it is not a good application for interchangeable walls. In between the two extremes, we have painted walls that are flat and usually have one solid color. The paint can be painted over so it is fairly easy to change the appearance of the painted walls.

If a builder wants walls that have elaborated patterns or natural material look, such as wood, he has to use the natural materials. Often the natural materials are expensive, so their applications for walls are very limited. Moreover, it takes time and skills to build such a wall, and, thus, it does not allow for quick changes of the patterns, which are essential in some applications.

The traditional linoleum or laminate wall tiles do not allow a wide range of decorative functionality, and, thus, limit users' applications of wall decor. Furthermore, wall mounting, replacing or removing, these tiles is not easy or non-skill task. Most of the surface coatings in the past have only been used on a floor, and, thus, repurposing them for wall applications requires some skill. These old materials also require extra tools and adhesive to adhere the materials to the surface of a wall.

For the above limitations, it is desirable to have a wall decor apparatus that can be easily and quickly applied to a wall surface, and allows for quick interchangeable designs or placement.

OBJECTIVE OF THE INVENTION

It is the object of this invention to create a wall laminate, particularly vinyl wall laminate.
It is the object of this invention to provide an interchangeable pattern wall laminate.
It is the object of this invention to provide a wall laminate that extends the range of utility of wall covers.
It is the object of this invention to provide a wall laminate that can be spread along a larger surface.
It is the object of this invention to provide a wall laminate that can be installed on different surfaces.
It is the object of this invention to provide a wall laminate that can be removed and repurposed.
It is the object of this invention to provide a wall laminate that is made of nylon-vinyl.
It is the object of this invention to provide a wall laminate that can be easily installed by ordinary consumers.
It is the object of this invention to provide a wall laminate that can be peeled and stuck.
It is the object of this invention to provide a wall laminate that uses magnetic adhesion.
It is the object of this invention to provide a wall laminate that comprises an interchangeable vinyl design sheet.

SUMMARY OF THE INVENTION

A wall tile apparatus is disclosed comprising: at least six planar panels, wherein the six planar panels comprise; at least two layers comprised of a polyvinyl chloride composition; at least one layer comprised of a composite material having 3D printing on the composite material; at least one layer comprised of a webbed fiberglass composition; at least one layer comprised of a magnetic substrate. In one embodiment, at least one layer comprised of polyvinyl chloride is an outer layer. In one embodiment, a wall laminate comprising one or more wall tiles stated herein wherein the wall laminate provides an interchangeable pattern. In one embodiment, the wall laminate comprises nylon-vinyl. In one embodiment, the wall laminate comprises magnetic adhesion. In one embodiment, the wall laminate comprises peel-and-stick attachment technology. In another aspect of the invention, a wall tile is disclosed comprising: at least a plurality of planar panels, wherein the planar panels comprise; at least two layers comprised of a polyvinyl chloride composition; at least one layer comprised of a composite material having printing on the composite material; at least one layer comprised of a webbed fiberglass composition; at least one layer comprised of a magnetic substrate. In one embodiment, the planar panels comprise at least one UV coating layer comprises of acrylic base with UV curing material applied. In one embodiment, the printing on the composite material includes 3D-Printing.

BRIEF DESCRIPTION OF THE DRAWINGS

These and other features and advantages of the invention will not be described with reference to the drawings of certain preferred embodiments, which are intended to illustrate and not to limit the invention, and in which.

DETAILED DESCRIPTION OF THE DRAWINGS

The invention will be described in the context of a preferred embodiment unless otherwise indicated.

Figure 1:
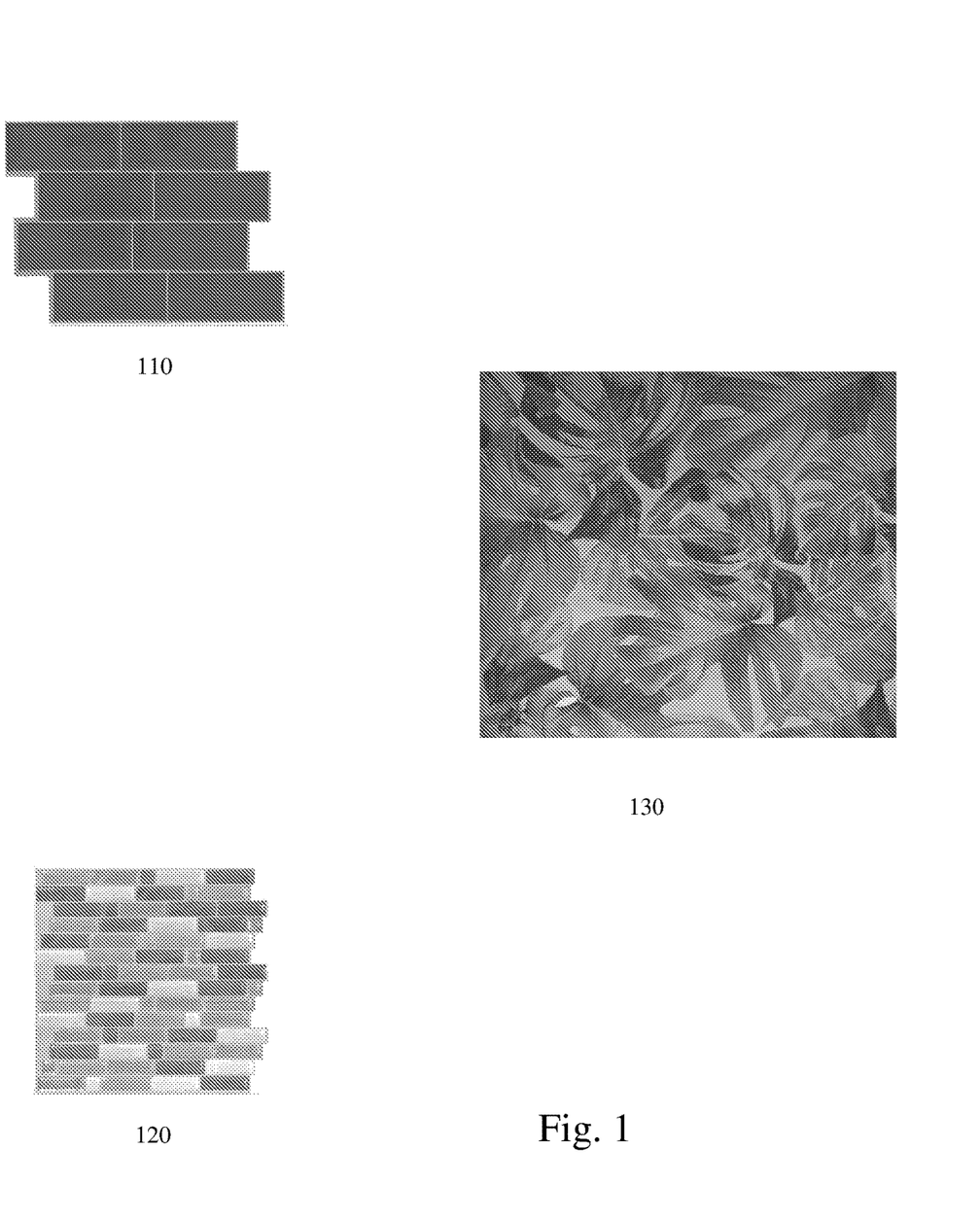
FIG. 1 illustrates prior arts of wall tiles.

FIG. 1 illustrates prior arts 110 and 120 of wall tiles, and 130 of wallpapers. As disclosed above, wall tiles, although more durable and maintain their appearances better over a long period, they were usually flat and solid color, and, thus, restricted the types of décor applications. Wallpapers on the other hand were very colorful and have elaborated patterns and arts, but do not maintain the appearances over a long period. Either type of these wall covers was not easily taken off a wall for interchangeable wall covers. These wall covers will not be good to cover walls of art studios, art exhibitions, commercial shows, etc. They can be replaced but it is expensive and time consuming to replace them. Furthermore, there are situations that demand wall covers to have textures that wallpapers or traditional wall tiles cannot meet.

Figure 2:
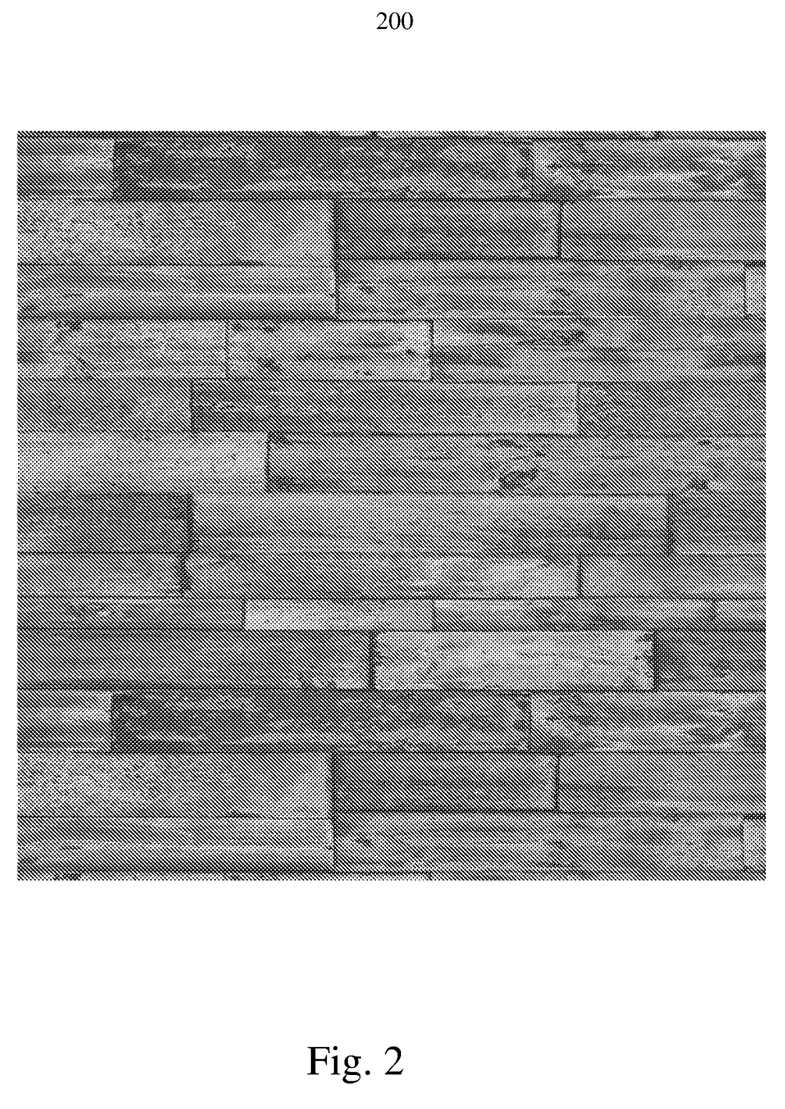
FIG. 2 illustrates an embodiment of the current invention.

FIG. 2 illustrates an embodiment 200 of the current invention. As disclosed, the embodiment has a natural look of wood. Moreover, it has the texture of real wood. FIG. 2 shows an implementation of rustic wood panel, and this embodiment 200 has the look, feel and touch of a real rustic wood panel. It is appreciated that any natural materials' look, feel and touch could be implemented as users' desire. It is also appreciated that there is no constraints on the dimensions of the embodiment 200. There is only practical limit of transporting the embodiment 200 to the site of the wall to be built.

Figure 3:
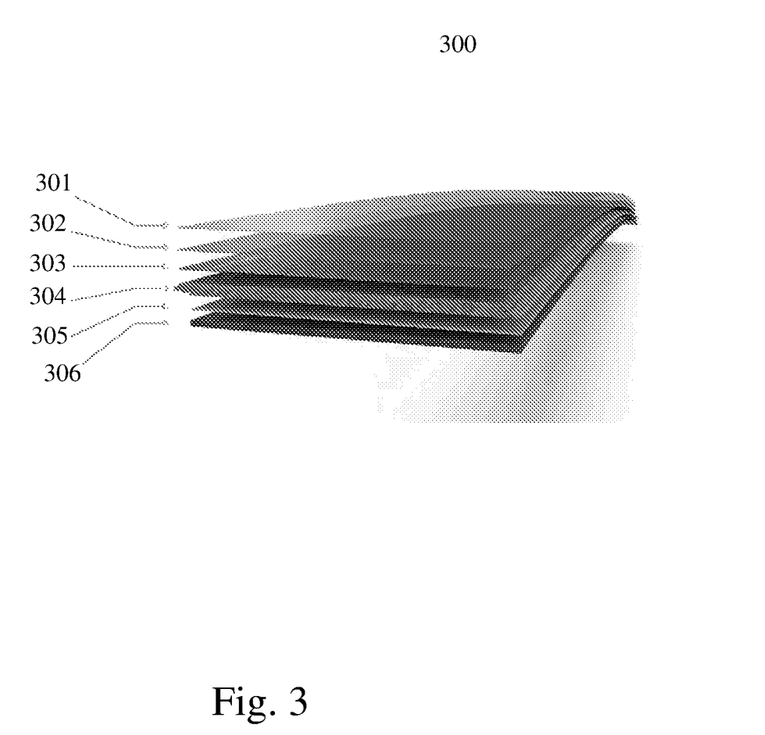
FIG. 3 is an exploded view of an embodiment of the current invention that illustrates the layers of an exemplary laminate.

FIG. 3 illustrates and suggests various materials used in the construction of an embodiment 300 of the current invention. The embodiment 300 is a laminate of multiple layers of materials that provide its durability and also allow the embodiment's exposed surface to be textured as designed. It is appreciated that the embodiment 300, the materials used, and the arrangement of the layers of the materials are exemplary, and there are many variations of materials used and their arrangements. The embodiment 300 comprises layer 301 of urethane stain shield, which has excellent resistance against spills, chemicals and abrasion. That is it raises the durability of the embodiment 300. The embodiment 300 further comprises a layer 302 of wear resistance PVC. Like the 301 layer, layer 302 further raises the durability of 300 against frictional wear and tear. With these two protection layers the embodiment 300 could also withstand an exposure to water and humidity. The embodiment 300 further comprises a layer 303 of composite material. This layer 303 allows 3-D printing, and, thus, industrial production of a designed texture. The layer 303 allows the embodiment 300 to have unique texture as natural construction materials, like wood or stones. The embodiment 300 further comprises a layer 304 of PVC. This layer forms the bulk of the embodiment 300, and the foundation for other layers, top and bottom, to attach. The embodiment 300 further comprises a layer 305 of webbed fiberglass which added rigidity to the board. Finally, the embodiment 300 comprises a layer 306 of flexible PVC. This layer protects the embodiment from moisture, vapor or water.

Figure 4:
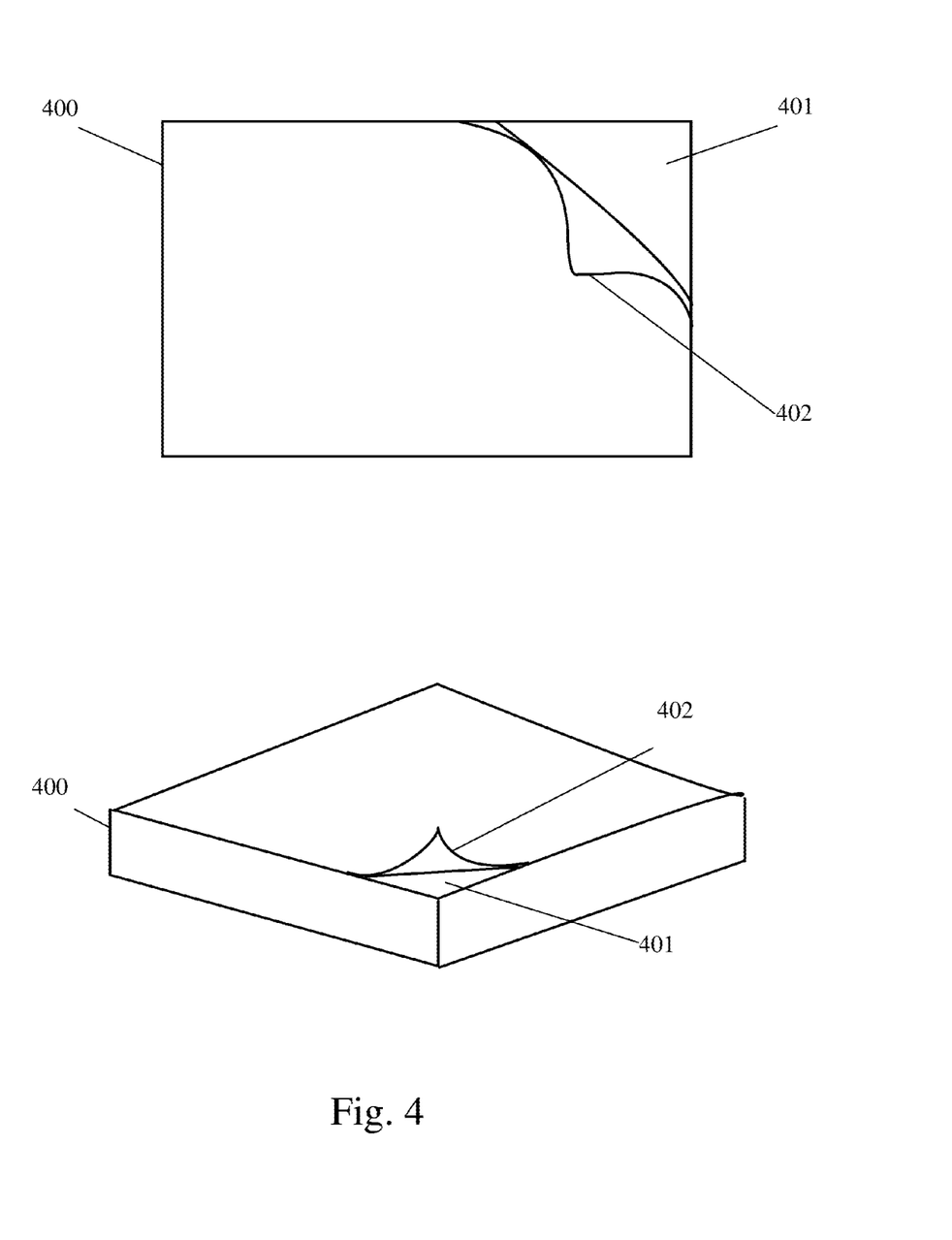
FIG. 4 illustrates an embodiment of the current invention that uses peel and stick technology.

FIG. 4 illustrates a front and perspective view of an embodiment 400 of the current invention that comprises a peel-and-stick attachment technology. The embodiment 400 comprises a thin layer 401 of adhesive on the back. When the embodiment has not yet installed, a thin non-stick film 402 covers the adhesive preventing dust or debris from dirtying the adhesive layer 401 and reducing the effectiveness of the adhesive layer. Without an unblemished surface, the adhesive layer 401 does not make a full contact with the wall, and risks a higher chance of being detached. When the embodiment 400 is ready to be installed, the user just peels off the backing thin film 402, as depicted, lines up the corners and edges of the embodiment 400, and presses it hard against the wall. The pressure force presses the adhesive layer 402 against the wall, and as the adhesive layer 402 makes full contact with the wall, the adhesive bonds with the wall and holds the embodiment 400 in place. It is appreciated that the adhesive layer 401 can cover the whole area of the back of the embodiment 400, or be divided in N adhesive strips.

Figure 5:
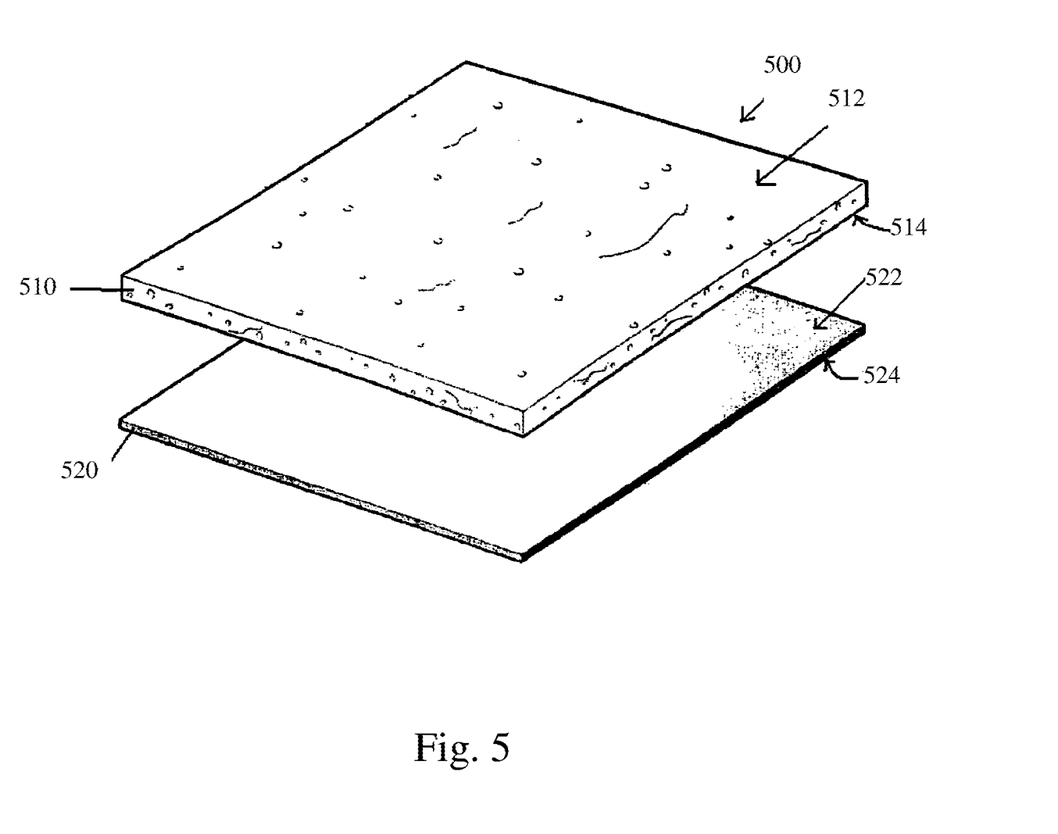
FIG. 5 illustrates another embodiment of this invention that uses magnetic technology.

FIG. 5 illustrates an embodiment 500 of the current invention that comprises a magnetized back which can be affixed to a wall coated with magnetic paint. The embodiment 500 preferably consists of a top lamina 510 and a magnetic substrate 520. It is appreciated that the top lamina 510 can be the embodiment 300 as disclosed above and illustrated in FIG. 3 or be the embodiment 700 as disclosed above and illustrated in FIG. 7 or be the embodiment 800 as disclosed above and illustrated in FIG. 8. It is appreciated that the magnetic substrate can be a composite of ferrous metal and non-ferrous materials depending on the applications of the tiles. The non-ferrous materials lighten the embodiment 500 for easy handling and installation. Where a strong magnetic force is required, the majority of or whole substrate 520 is made of ferrous metals. The magnetic substrate 520 has a top surface 522 and a bottom surface 524. The top surface 520 of the magnetic substrate is preferably provided with a strong adhesive. The top lamina 510 also has a top surface 512 and a bottom surface 514. The bottom surface 514 of the lamina is preferably laminated to the adhesive on the top surface 522 of the magnetic substrate to form the embodiment 500. It is appreciated that the lamination process may be done by pressing the top surface 512 of the lamina 510 downward to secure the parts together. Alternatively, a large sheet of laminated top and magnetic substrate may be punched or cut out through both layers to produce a cut-out of tile size.

Figure 6:
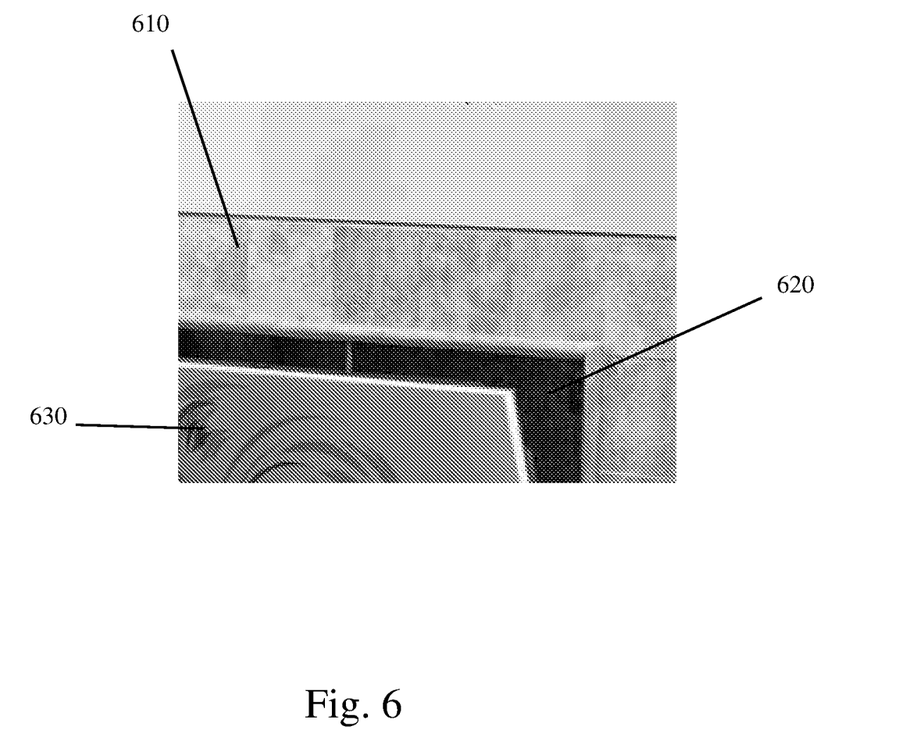
FIG. 6 illustrates an installation of embodiments of the current invention.

FIG. 6 illustrates an installation of embodiments of the current invention that is being installed as an interchangeable décor backsplash. In this installation, the perimeter of the backsplash is covered with peel-and-stick embodiments 610, as disclosed above, of the current invention. The uncovered wall 620 in the center of the backsplash is painted with magnetic paint, and a magnetic embodiment 630, as disclosed above, of the current invention printed with art is mounted in the center by magnetic force between the magnetic paint and the magnetic back substrate of the embodiment 630. The embodiment 630 is manufactured to fit the painted but uncovered center wall. As arranged, the magnetic embodiment 630 can be quickly mounted and dismounted for different center pieces or for cleaning of the center pieces.

FIG. 6 illustrates an installation of embodiments of the current invention that is being installed as an interchangeable décor backsplash. In this installation, the perimeter of the backsplash is covered with peel-and-stick embodiments 610, as disclosed above, of the current invention. The uncovered wall 620 in the center of the backsplash is painted with magnetic paint, and a magnetic embodiment 630, as disclosed above, of the current invention printed with art is mounted in the center by magnetic force between the magnetic paint and the magnetic back substrate of the embodiment 630. The embodiment 630 is manufactured to fit the painted but uncovered center wall. As arranged, the magnetic embodiment 630 can be quickly mounted and dismounted for different center pieces or for cleaning of the center pieces.

Figure 7:
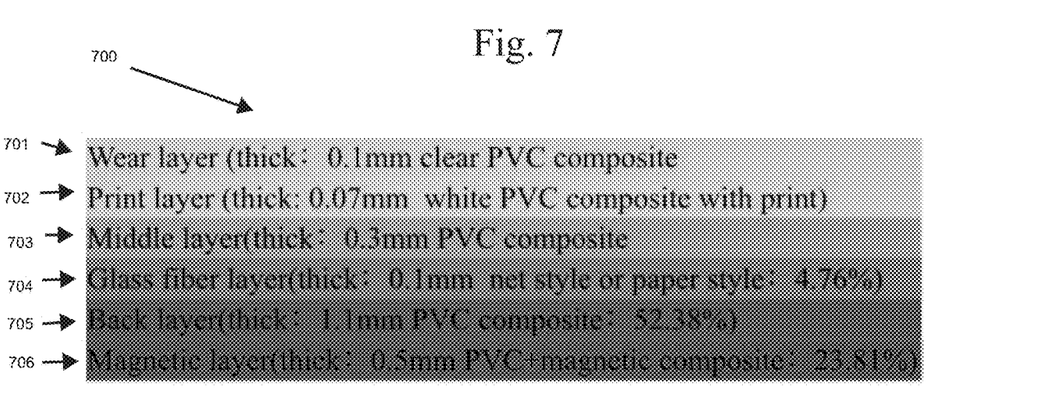
FIG. 7 illustrates another embodiment of this invention that uses magnetic technology.

FIG. 7 illustrates and suggests another method used in the construction of an embodiment 700 of the current invention. The embodiment 700 is a laminate of multiple layers of materials that provide its durability and also allow the embodiment's exposed surface to be textured as designed. It is appreciated that the embodiment 700, the materials used, and the arrangement of the layers of the materials are exemplary, and there are many variations of materials used and their arrangements. The embodiment 700 comprises wear layer 701 which is board comprised of polyvinyl chloride composition with a thickness of 0.1 mm to 0.3 mm with preferred thickness of 0.1 mm. If has excellent resistance against spills, chemicals and abrasion. That is it raises the durability of the embodiment 700. The next layer 702 allows 3-D printing and regular printing, and, thus, industrial production of a designed texture. This layer which is a board comprised of polyvinyl chloride composition with a thickness of 0.3 mm to 0.6 mm with preferred thickness of 0.3 mm. The layer 702 allows the embodiment 700 to have unique texture as natural construction materials, like wood or stones. The embodiment 703 further comprises a layer 703 of polyvinyl chloride composition with a thickness of 0.3 mm to 0.6 mm with preferred thickness of 0.3 mm. This is to increase rigidity. The embodiment 700 further comprises a layer 704 of webbed fiberglass which critical in adding rigidity to the board. The preferred thickness is 01.mm as a good balance between strength and weight. Finally, the embodiment 700 comprises a back layer 705 comprises of polyvinyl chloride composition with a thickness of 1.1 mm to 1.6 mm with preferred thickness of 1.mm. Lastly, a layer 706 which is magnetic layer descripted in detail above with respect to FIG. 5 is matted as the last layer to embodiment 700. The preferred thickness is 0.5 mm.

Figure 8:
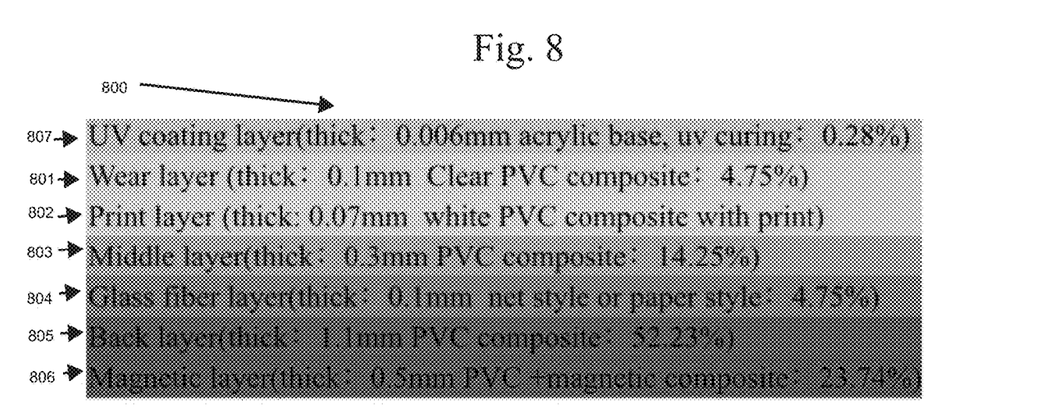
FIG. 8 illustrates an installation of embodiments of the current invention.

FIG. 8 illustrates and suggests another method used in the construction of an embodiment 800 of the current invention. The embodiment 800 is a laminate of multiple layers of materials that provide its durability and also allow the embodiment's exposed surface to be textured as designed. It is appreciated that the embodiment 800, the materials used, and the arrangement of the layers of the materials are exemplary, and there are many variations of materials used and their arrangements. The embodiment 800 comprises wear layer 801 which is board comprised of polyvinyl chloride composition with a thickness of 0.1 mm to 0.3 mm with preferred thickness of 0.1 mm. If has excellent resistance against spills, chemicals and abrasion. That is it raises the durability of the embodiment 800. The next layer 802 allows 3-D printing and regular printing, and, thus, industrial production of a designed texture. This layer which is a board comprised of polyvinyl chloride composition with a thickness of 0.3 mm to 0.6 mm with preferred thickness of 0.3 mm. The layer 802 allows the embodiment 800 to have unique texture as natural construction materials, like wood or stones. The embodiment 803 further comprises a layer 803 of polyvinyl chloride composition with a thickness of 0.3 mm to 0.6 mm with preferred thickness of 0.3 mm. This is to increase rigidity. The embodiment 800 further comprises a layer 804 of webbed fiberglass which critical in adding rigidity to the board. The preferred thickness is 01.mm as a good balance between strength and weight. Finally, the embodiment 800 comprises a back layer 805 comprises of polyvinyl chloride composition with a thickness of 1.1 mm to 1.6 mm with preferred thickness of 1.mm. Lastly, a layer 806 which is magnetic layer descripted in detail above with respect to FIG. 5 is matted as the last layer to embodiment 800. The preferred thickness is 0.5 mm. More importantly, the embodiment 800 comprises a UV coating layer 807 comprises of acrylic base with UV curing material mixed prepared with a thickness of 0.006 mm to 0.01 mm with preferred thickness of 0.006 mm.

The invention claimed is:

1. A wall tile comprising at least a plurality of planar panels, wherein said planar panels comprise at least two layers comprised of a polyvinyl chloride composition;
   at least one layer comprised of a composite material having printing thereon; at least one layer comprised of a webbed fiberglass composition; at least one layer comprised of a magnetic substrate;
   wherein said planar panels comprise at least one UV coating layer that comprises an acrylic base with UV curing material applied;
   wherein said printing on said composite material includes 3D printing.

* * * * *